(12) United States Patent
Schibli

(10) Patent No.: US 10,804,672 B2
(45) Date of Patent: Oct. 13, 2020

(54) MONOLITHIC MODE-LOCKED LASER

(71) Applicant: The Regents of the University of Colorado, Denver, CO (US)

(72) Inventor: Thomas R Schibli, Boulder, CO (US)

(73) Assignee: The Regents of the University of Colorado, a body, Denver, CO (US)

(*) Notice: Subject to any disclaimer, the term of this patent is extended or adjusted under 35 U.S.C. 154(b) by 0 days.

(21) Appl. No.: 16/096,457

(22) PCT Filed: Jan. 16, 2017

(86) PCT No.: PCT/US2017/013677
§ 371 (c)(1),
(2) Date: Oct. 25, 2018

(87) PCT Pub. No.: WO2017/189060
PCT Pub. Date: Nov. 2, 2017

(65) Prior Publication Data
US 2019/0165539 A1    May 30, 2019

Related U.S. Application Data

(60) Provisional application No. 62/327,298, filed on Apr. 25, 2016.

(51) Int. Cl.
*H01S 3/06* (2006.01)
*H01S 3/081* (2006.01)
(Continued)

(52) U.S. Cl.
CPC .......... *H01S 3/0627* (2013.01); *H01S 3/042* (2013.01); *H01S 3/083* (2013.01); *H01S 3/0811* (2013.01);
(Continued)

(58) Field of Classification Search
CPC .... H01S 3/0627; H01S 3/1618; H01S 3/0941; H01S 3/042; H01S 3/1305; H01S 3/1304; H01S 3/083; H01S 3/1118; H01S 3/137; H01S 3/1608; H01S 3/0811; H01S 3/139; H01S 3/17; H01S 3/1307; H01S 3/173; H01S 3/09415; H01S 3/0621; H01S 3/0612
See application file for complete search history.

(56) References Cited

U.S. PATENT DOCUMENTS 6,393,035 B1 * 5/2002 Weingarten ........... H01S 3/1118
372/11
7,602,825 B1 * 10/2009 Lin ....................... H01S 3/1394
372/18
(Continued)

*Primary Examiner* — Xinning (Tom) Niu
(74) *Attorney, Agent, or Firm* — Macheledt Bales LLP; Jennifer L. Bales

(57) ABSTRACT

A monolithic laser cavity (100, 200, 300, 400) for generating an output series of pulses (37) based on an input pump signal 36. This is achieved by a novel cavity design that utilizes a transparent, low-loss, and near zero-dispersion spacer (38) to form an optical resonator without the use of wave-guiding effects. The pulse forming material (32), optical elements (10-16, 30, 31, 33), and the laser gain medium (34) are in direct contact with the spacer and/or each other without any free-space sections between them. Therefore, the light inside the laser cavity never travels through free space.

20 Claims, 4 Drawing Sheets

(51) Int. Cl.
*H01S 3/083* (2006.01)
*H01S 3/11* (2006.01)
*H01S 3/13* (2006.01)
*H01S 3/137* (2006.01)
*H01S 3/139* (2006.01)
*H01S 3/16* (2006.01)
*H01S 3/042* (2006.01)
*H01S 3/0941* (2006.01)
*H01S 3/17* (2006.01)

(52) U.S. Cl.
CPC .......... *H01S 3/0941* (2013.01); *H01S 3/1118* (2013.01); *H01S 3/1304* (2013.01); *H01S 3/1305* (2013.01); *H01S 3/1307* (2013.01); *H01S 3/137* (2013.01); *H01S 3/139* (2013.01); *H01S 3/1608* (2013.01); *H01S 3/1618* (2013.01); *H01S 3/17* (2013.01); *H01S 3/0612* (2013.01); *H01S 3/0621* (2013.01); *H01S 3/09415* (2013.01); *H01S 3/173* (2013.01)

(56) References Cited

U.S. PATENT DOCUMENTS

| | | | |
|---|---|---|---|
| 2003/0118060 A1* | 6/2003 | Spuehler | H01S 3/1118 372/18 |
| 2004/0190564 A1* | 9/2004 | Zhou | H01S 3/113 372/10 |
| 2005/0163170 A1* | 7/2005 | Okhotnikov | H01S 3/067 372/6 |
| 2011/0150012 A1* | 6/2011 | Li | H01S 3/0606 372/11 |
| 2012/0236882 A1* | 9/2012 | Caird | G02F 1/3551 372/9 |

* cited by examiner

MONOLITHIC MODE-LOCKED LASER

This invention was made with government support under grant number PHY1253044 awarded by the National Science Foundation. The government has certain rights in the invention.

BACKGROUND OF THE INVENTION

Field of the Invention

The present invention relates to monolithic mode-locked lasers. In particular, the present invention relates to monolithic mode-locked lasers without free-space sections.

Discussion of Related Art

Lasers that produce highly periodic trains of ultra-short pulses of light ($<10^{-12}$ s) enable a large number of applications that would not be possible with electronically generated signals. Such applications include optical frequency comb generation, electro-optic sampling, photonic microwave generation or telecom applications. Key performance aspects of such optical pulse trains are the periodicity or timing/phase jitter of the pulse trains, the pulse duration, pulse repetition rate and optical intensity and phase fluctuations. For practical use, power consumption, size, weight and robustness are of high importance. Current state-of-the-art systems are either too delicate, too bulky or of poor performance for a large number of commercial applications. This invention simultaneously improves all these aspects.

The current state-of-the-art can be roughly separated into two categories: free-space lasers (aka "bulk" lasers) and compact lasers, such as fiber and waveguide lasers. Bulk lasers have high performance, but require a carefully isolated environment and maintenance. Compact lasers are small and tough and don't require maintenance, but have limited performance.

Bulk laser systems produce stable pulse trains, but are bulky and/or delicate. Applications of these systems are typically limited to well controlled environments, such as air-conditioned optics labs. Systems in this category are typically based on solid-state lasers, in which the laser beam travels through free space, except for a short piece of a glass, ceramic, semiconductor or crystal-based optical amplifier. The benefit of this design is the low optical loss, low chromatic dispersion and low optical non-linearities, which enable the production of low-noise optical pulse trains.

The major issues with bulk lasers are their complexity, maintenance requirements and strong coupling to the environment. This has largely prevented widespread use of such sources outside of well-controlled environments. The lowest-noise systems (i.e. the most suitable ones for the aforementioned applications) often require periodic realignment and tweaking to get the best performance. These systems also need a vibration isolated and rigid base to function properly, which adds significantly to their weight and footprint. Most bulk lasers are too large and too delicate to be integrated into a bench-top or a rack-mounted instrument.

Compact systems are very rugged in addition to being compact, but are typically limited in their performance due to design constraints. Such systems are typically efficient and compact enough to be integrated into an optical, optoelectronic or electronic instrument, are fully turn-key and typically do not require user interaction over the useful life of the system. Most commonly, such lasers would be built with optical fibers or optical waveguides, which confine the light inside the laser resonator. This technology makes these lasers robust, compact, and rather insensitive to environmental perturbations.

The major issue with current compact lasers is their limited optical performance due to design constraints. The major limitations originate from their high intracavity loss, non-zero wave-guide dispersion, large non-linearities, and small optical mode cross sections. All these effects add to the fundamental noise (often-times referred to as the 'quantum-limited noise') of these lasers. The main driving terms to this fundamental noise are typically a combination of amplified spontaneous emission driven noise (i.e. a coupling to vacuum fluctuations), Gordon-Haus jitter and Amplitude-to-Phase noise conversion. In particular, in the field of photonic microwave generation, fiber or waveguide-lasers have struggled to reach the level of performance that decade-old bulk-laser systems can reach.

Examples of such compact lasers include "Integrated Low-Jitter 400-MHz Femtosecond Waveguide Laser" by Hyunil Byun et al., IEEE PHOTONICS TECHNOLOGY LETTERS, VOL. 21, NO. 12, Jun. 15, 2009 763 (a mode-locked, fully integrated waveguide laser with relatively low jitter of round 24 fs, but still unacceptable with high phase noise power spectral densities of about 1 million times worse than the present invention achieves).

See also "Low timing jitter and intensity noise from a soliton Er-fiber laser mode-locked by a fiber taper carbon nanotube saturable absorber" by Chur Kim et al., OPTICS EXPRESS/Vol. 20, No. 28/31 Dec. 2012, 29524 (which reviews the current state of the art of all-fiber mode-locked lasers without free-space sections (FIG. 1 top-left). The phase noise power spectral density of these lasers is ~100,000—times worse than in the present invention (FIG. 2)).

See also "250 mW, 1.5_m monolithic passively mode-locked slab-coupled optical waveguide laser" by Jason J. Plant et al., OPTICS LETTERS/Vol. 31, No. 2/Jan. 15, 2006, 223 (discloses a monolithic mode-locked semiconductor laser having an estimated phase noise spectral power density of around 1 million times worse than the present invention).

Continuous wave monolithic lasers have existed for some time. See, for example, "Monolithic, unidirectional single-mode Nd:YAG ring laser" by Thomas J. Kane and Robert L. Byer, OPTICS LETTERS/Vol. 10, No. 2/February 1985, 65, and related U.S. Pat. Nos. 4,578,793 and 5,043,996. Attempts have been made to generate pulses with similar designs, but these have not been successful.

A need remains in the art for mode-locked laser systems having the performance of traditional bulk lasers, along with the toughness and compactness of fiber or waveguide lasers.

SUMMARY OF THE INVENTION

The objective of this invention is to build mode-locked laser systems that have the performance of traditional bulk lasers, along with the toughness and compactness of fiber or waveguide lasers. This is achieved by novel cavity designs that utilize a transparent, low-loss, and near zero-dispersion spacer material to form an optical resonator without the use of wave-guiding effects (a small amount of incidental wave-guiding might occur in a small section of the cavity). Low loss mirrors (with or without dispersion compensation) and the laser gain medium are in direct contact to this material without a free-space section between them. Therefore, the light inside the laser resonator never travels through free space, which renders the laser insensitive to external perturbations, such as acoustics, temperature, pressure, humidity, contaminations or vibrations etc. Pulses in such lasers could be produced by, but not limited to, fast optical nonlinearities, such as the optical Kerr-effect, or by saturable absorbers, such as semiconductor saturable absorber mirrors (SESAM), organic or inorganic dyes, or by low-dimensional materials with optical saturation, such as graphene or carbon nanotubes, or a combination thereof. Similar to the optical mirror coatings, the mode-locking device is also in physical contact with the laser cavity. Since the mirrors and the mode-locking device are held by the rigid optical cavity spacer, no user-interaction is required over the lifetime of the laser.

Depending on the choice of materials, the mode-locking device, and/or the gain medium could be heat-sunk through the cavity spacer. This is of particular interest when gain media with low thermal conductivity are to be used. On the other hand, the gain medium and the cavity spacer could be the same material.

Lasers according to the present invention exceed the phase-noise-performance of the best solid-state lasers at comparable pulse-repetition rates built to date, at a footprint and robustness rivaling mode-locked fiber and waveguide lasers. The major improvements in performance compared to fiber or waveguide lasers are the significantly lower optical loss due to the improved design, low chromatic dispersion, and low optical non-linearities. Compared to solid-state lasers, there is no free-space section inside the laser cavity, which makes these lasers very robust against environmental perturbations, such as vibrations, acoustics, temperature, pressure, humidity and dust etc.

A monolithic laser cavity according to the present invention generates an output series of pulses with an input pump signal and comprises a spacer formed of a solid material which is optically transparent at desired frequencies, a solid laser gain medium affixed to the spacer with no gas or vacuum gap between the spacer and the gain medium, a solid pulse forming material affixed to the spacer with no gas or vacuum gap between the spacer and the pulse forming medium, and optics for confining a laser beam at the desired frequencies within the cavity substantially without waveguiding. The cavity could be linear or ring. In some embodiments the gain medium is disposed between the pulse forming material and the spacer.

The pulse forming material might comprise a semiconductor saturable absorber, an organic material, or a material resulting in Kerr-lens mode-locking. In some cases the gain medium also acts as the pulse forming material. Note that it is common to use the term "semi-conductor" for a variety of materials in the context of mode-locking. See, for example, U.S. Pat. No. 6,538,298.

The optics might include a dispersion compensating element, a loss modulator, a phase modulator, a cavity length modulator, or some combination of these.

Some embodiments include a stabilization system for comparing laser output (or a signal based on the output) to a reference and modifying laser performance based on this comparison. The reference and the signal based on the output might be in a different frequency band than the laser beam (e.g. RF or another frequency of light). The stabilization system might affect the repetition rate of the pulses or the phase of the optical carrier.

In some embodiments the spacer sinks heat from the gain medium. In some embodiments the spacer and the gain medium comprise the same material.

DETAILED DESCRIPTION OF THE INVENTION

The following table shows elements of the present invention along with their associated reference numbers.

| Ref. No. | Element |
|---|---|
| 10 | Resonator end mirror |
| 11 | Dispersion compensating element |
| 12 | Loss modulator |
| 13 | Phase or cavity length modulator |
| 14 | Gain medium |
| 15 | Pulse forming means |
| 16 | Output coupling mirror |
| 17 | Monolithic cavity laser |
| 18 | Optically transparent medium |
| 19 | Pump energy |
| 20 | Laser output |
| 30 | Mirror: highly reflective for laser light; highly transmissive for pump light |
| 31 | Partially transmitting mirror for laser light |
| 32 | Saturable absorber mirror |
| 33 | Cavity length tuning element |
| 34 | Laser gain medium |
| 35 | Laser beam path in resonator |
| 36 | Pump energy |
| 37 | Mode-locked laser output |
| 38 | Spacer: optically transparent material |
| 50 | Feedback error generation system |
| 52 | Reference |
| 53 | Reference signal |
| 54 | Error signal generator |
| 55 | Error signal |
| 56 | Control system |
| 57 | Control system signal |
| 60 | RF feedback error generation system |
| 61 | Signal convertor |
| 62 | Converted signal |
| 63 | Error signal generator |
| 64 | RF Reference |
| 65 | RF Reference signal |
| 70 | Second embodiment of RF feedback error generation system |
| 71 | Signal conversion |
| 73 | Error signal(s) generator |
| 74 | RF and/or optical reference(s) |
| 75 | Reference signal(s) |
| 77 | Carrier envelope offset frequency |
| 78 | Error Signal(s) |
| 100 | Monolithic laser cavity |
| 200 | Second embodiment of monolithic laser cavity |
| 300 | Generalized linear cavity monolithic laser |
| 400 | Generalized ring cavity monolithic laser |
| 500 | Stabilizing system with optical reference |
| 600 | Stabilizing system with RF reference |

-continued

| Ref. No. | Element |
|---|---|
| 700 | Generalized stabilizing system with RF and/or optical references |

Figure 1A:
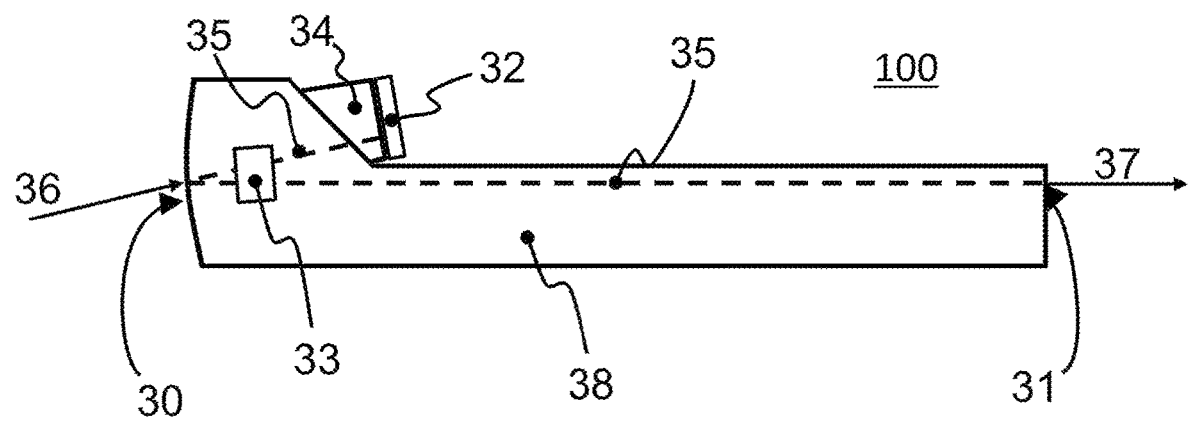
FIG. 1A is a schematic side cutaway view of a linear cavity design according to the present invention.

FIG. 1A is a schematic side cutaway view of a linear cavity oscillator (also called a monolithic laser) 100 according to the present invention. Note that the term "cavity" is customarily used as a term for the resonator, even though the resonator is solid.

Oscillator 100 is mode-locked, monolithic and solid state ("monolithic" herein means that there are no free space sections). It comprises a cavity spacer 38 formed of an optically transparent material containing a cavity length-tuning element 33. Affixed to a surface on cavity spacer 38 is a laser gain medium element 34 with a saturable absorber mirror 32 at its other end. Pump light 36 is coupled into cavity 100 via a curved mirror 30, which is highly transmissive for pump light 36, and highly reflective of generated laser light 35 within cavity 100. The dotted line indicates the path followed by laser light 35. Mode-locked laser output light 37 is coupled out of cavity 100 via end mirror 31, which is partially transmissive of laser light 35. If desired, dispersion compensating could be incorporated into one of mirrors 30, 31, 32, or laser medium 34 or spacer 38.

In one preferred embodiment demonstrated by the present inventors, cavity spacer 38 comprises $CaF_2$ (calcium fluoride). Cavity length tuning element 33 is piezo-electric. Laser gain medium 34 is Yb:Er:glass, and saturable absorber mirror 32 is a SESAM. Mirror 30 is a Gires-Tournois interferometer coating. Mirror 31 is a T=0.27% output coupler. Note that in the device tested, cavity spacer 38 comprises two CaF2 pieces (for ease of fabrication) joined permanently by chemically activated bonding or temporarily by an appropriate index-matching oil. Thus, the two-piece cavity spacer as tested is equivalent to a single piece cavity spacer 38 as shown in FIG. 1.

The device shown in FIG. 1A includes a ~8.5 cm long $CaF_2$ spacer 38 which serves as the laser cavity. Spacer 38 and laser glass 34 are joined by chemically activated bonding, index-matching oil or other means. The laser mode inside the material is ~2 mm in diameter, except in the proximity of the laser glass 34, where it reaches a radius of ~30 micrometer at the surface of 32. This ensures low nonlinearity and negligible thermo-refractive effects. $CaF_2$ has both excellent transparency at the laser wavelength as well as zero second-order dispersion around 1545 nm, which is very close to the center of the laser operation. Therefore, third-order dispersion compensation is the main requirement for short-pulse operation. This is accomplished by a Gires-Tournois interferometer (GTI) coating 30 that is directly deposited on the $CaF_2$ spacer 38.

A semiconductor saturable absorber mirror (SESAM) 32 is directly affixed to the laser glass 34 to initiate and sustain mode-locking. Saturable absorber mirror 32 is attached via index-matching oil but could also be affixed via more permanent bonding techniques. The angle of the join ensures linear polarization of the laser light.

Saturable absorber mirror 32 is a single, erbium-doped, low-temperature-grown InGaAs quantum well on an AlGaAs/GaAs Bragg stack. Saturable absorber mirror 32 has a saturable loss of ~0.5% and even less nonsaturable loss. No degradation of saturable absorber mirror 32 was observed over several months of operation, demonstrating the excellent stability of the InGaAs quantum well even at gigahertz repetition rates.

Cavity spacer 38 also serves as a heat sink for laser glass 34. In testing, cavity spacer 38 dramatically reduced laser glass 34 surface temperature from 117 K above ambient to 32 K above ambient. This has proven to be a much more efficient cooling scheme than the typical side-cooling approach. The laser was operated at room temperature without any external sources of cooling. The total heat load was less than 0.2 W. No thermal power limitations or associated mode distortions were observed even when pumping at levels 2-3 times higher than required for mode-locked operation. In continuous wave operation (i.e., without saturable absorber mirror 32), intracavity powers in excess of 100 W were achieved without any measurable mode distortion or efficiency roll-off.

Figure 1B:
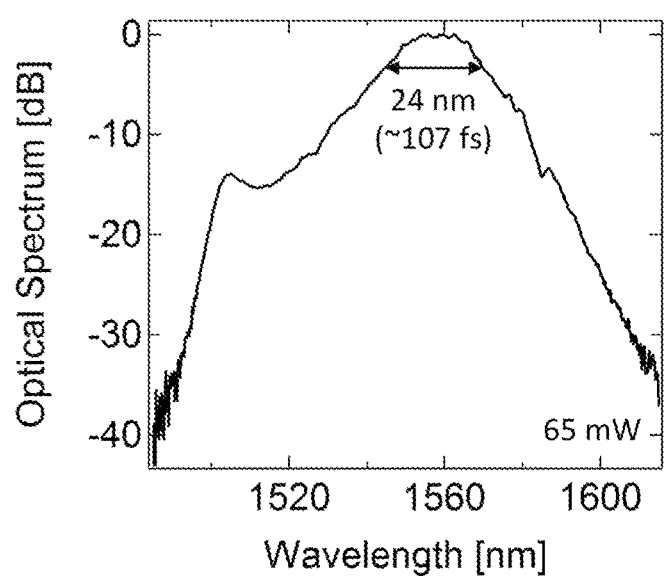
FIG. 1B is a plot showing experimental data (optical spectrum showing mode-locked operation) from the system of FIG. 1A.

FIG. 1B is a plot showing experimental data from the system of FIG. 1A. FIG. 1B shows the output signal 37 of laser 100 when pumped with pump signal 36 comprising ~265 mW optical power at 977 nm from a single mode, butterfly packaged pump diode stabilized with a polarization-maintaining fiber Bragg grating. Monolithic laser 100 self-starts into a stable mode-locking regime and emits ~65 mW average output power through a 0.27% output coupler 31 into a fundamental Gaussian beam mode with virtually no astigmatism. The coupling efficiency into a single-mode fiber (not shown) is over 90%. This is very close to the theoretical coupling limit of 92% for an uncoated fiber, indicating that the $M^2$ value of the beam is close to 1. An intracavity average power of 24 W is achieved by keeping cavity round-trip losses below 0.7%. The RMS fluctuations in the output power are <0.03%, measured at a 1.67 s gate time over 140 min of unstabilized operation in air.

Figure 2:
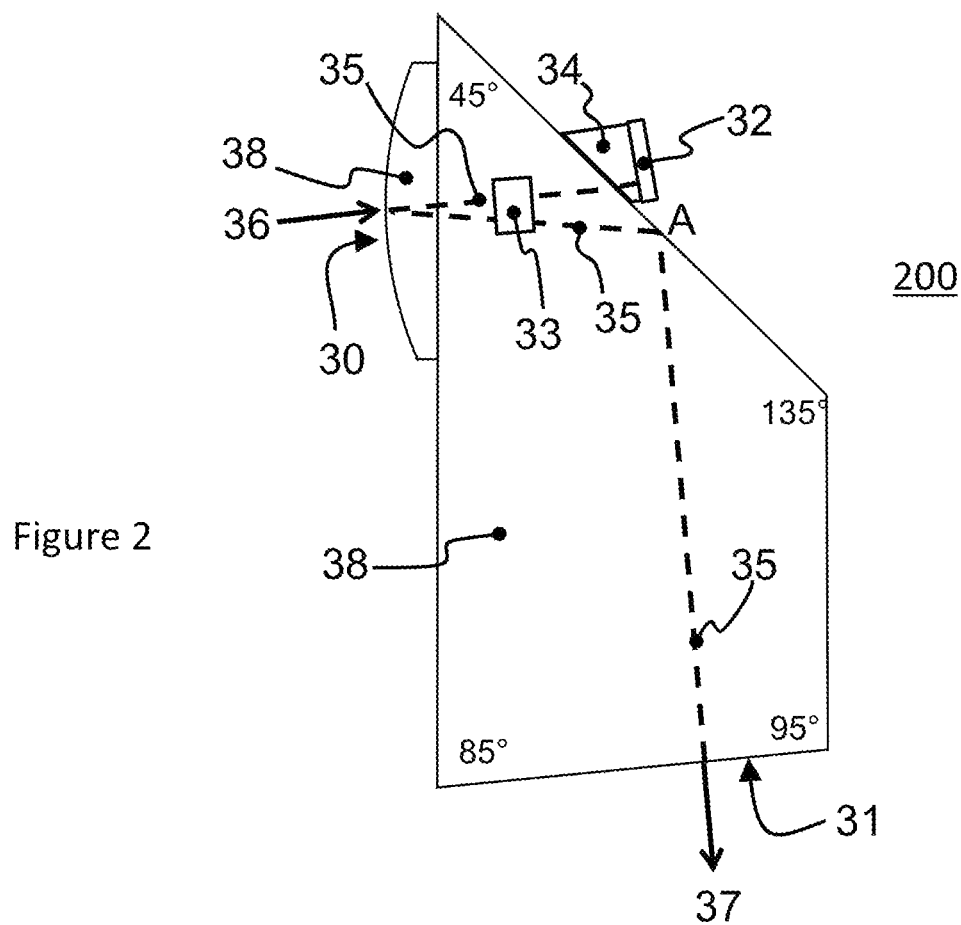
FIG. 2 is a schematic side cutaway view of a second linear cavity design according to the present invention.

FIG. 2 is a schematic side cutaway view of a second linear cavity design 200 according to the present invention. This embodiment is very similar to that shown in FIG. 1, and the same reference numbers are used to designate similar elements. In the embodiment of FIG. 2, point A designates total internal reflection. This embodiment is not as convenient to fabricate but may be useful in some applications.

Figure 3:
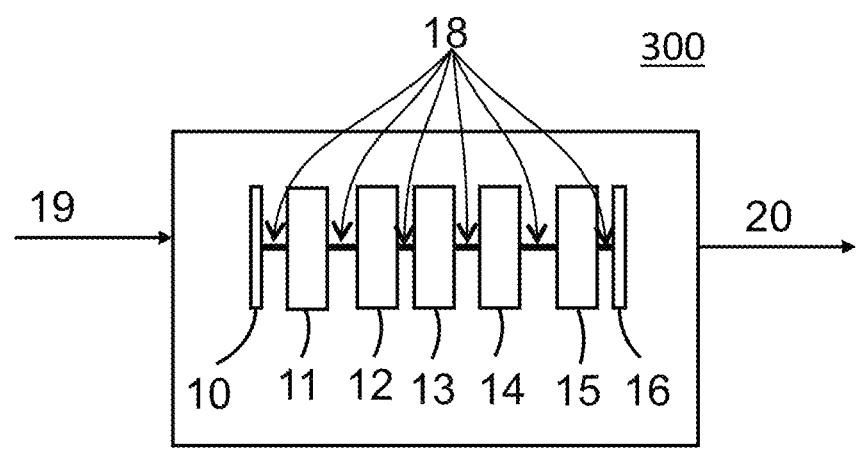
FIG. 3 is a schematic diagram showing a generalized linear cavity design according to the present invention.

FIG. 3 is a schematic diagram showing a generalized linear cavity design 300 according to the present invention. This diagram is intended to demonstrate that various elements may be added to the monolithic design in various configurations. In general there will be end mirrors 10 and 16, whereas at least one of them is partially transmissive, dispersion compensating element 11, gain medium 14 and pulse forming means 15, all integrally formed with an optically transparent spacer 18 in a desired configuration. One or more loss modulators 12 and phase or cavity length modulators 13 may also be useful. Pump energy 19 is coupled into linear cavity 300 and laser output 20 is coupled out.

Figure 4:
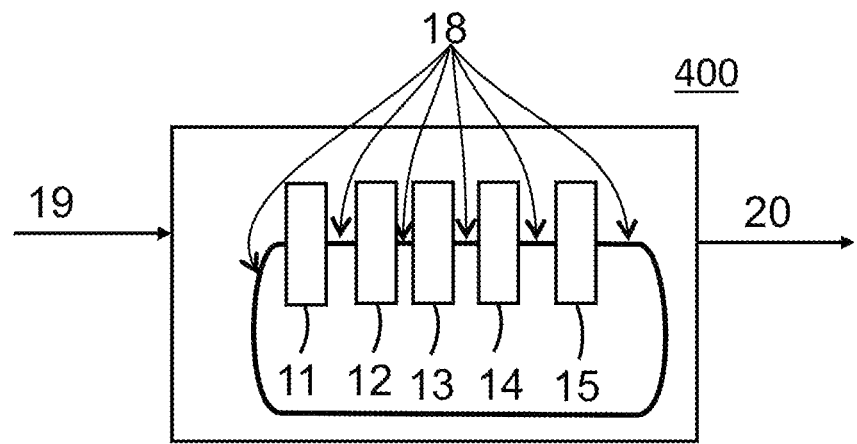
FIG. 4 is a schematic diagram showing a generalized ring cavity design according to the present invention.

FIG. 4 is a schematic diagram showing a generalized ring cavity design 400 according to the present invention. As in the embodiment of FIG. 4, various elements are integrally formed with an optically transparent spacer 18 in a desired configuration. The same reference numbers indicate similar elements. As an example, the transparent medium could be shaped to result in ring operation, such as a triangular-shaped optical material, where all three sides are mirrors. The light could then be along closed-loop path between these three mirrors. Other configurations include bow-tie-shaped closed loop path etc. The NPRO is another implementation of a ring cavity.

Figure 5:
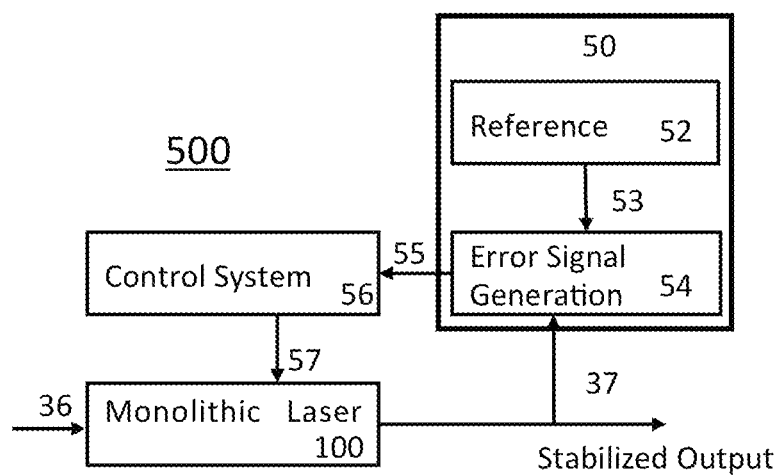
FIG. 5 is a schematic block diagram showing a system for stabilizing a laser to an optical reference according to the present invention.

FIG. 5 is a schematic block diagram showing a system 500 for stabilizing a laser 100 (or alternatively laser 200, 300, 400) to an optical reference 52 according to the present invention. Laser 100 is pumped with pump signal 36 and generates output signal 37 as shown in FIG. 1. A portion of laser output signal 37 is sent to Feedback error generation system 50, comprising reference 52 which generates reference signal 53 and error signal generator 54 which compares laser output signal 37 to reference signal 53 to generate error signal 55. Reference 22 might comprise a cavity-stabilized optical source (typically a cw-laser locked to a passive optical cavity); an optical source referenced to atomic, molecular or ion-transitions. (typically a cw-laser locked to atoms etc.); an optical source is stabilized to a delay line (such as an optical fiber); a combination of the above (e.g. an optical atomic clock as a combination of the first two); or a passive optical reference, such as a delay line or an optical resonator.

Feedback error generation system 50 might alternatively comprise a heterodyne beat-note between at least one of the longitudinal modes of the monolithic laser output signal 37 or a synthetic wavelength heterodyning setup to directly stabilize the repetition rate of the monolithic laser output signal 37.

Error signal 55 is provided to control system 56, which in turns generates a control signal 57 for altering the operation of laser 100 to reduce error signal 55. Control system 56 might comprise analog electronics; digital electronics; software-based electronics (such as FPGA, DSP, MCU, PC); or a combination of the above.

Figure 6:
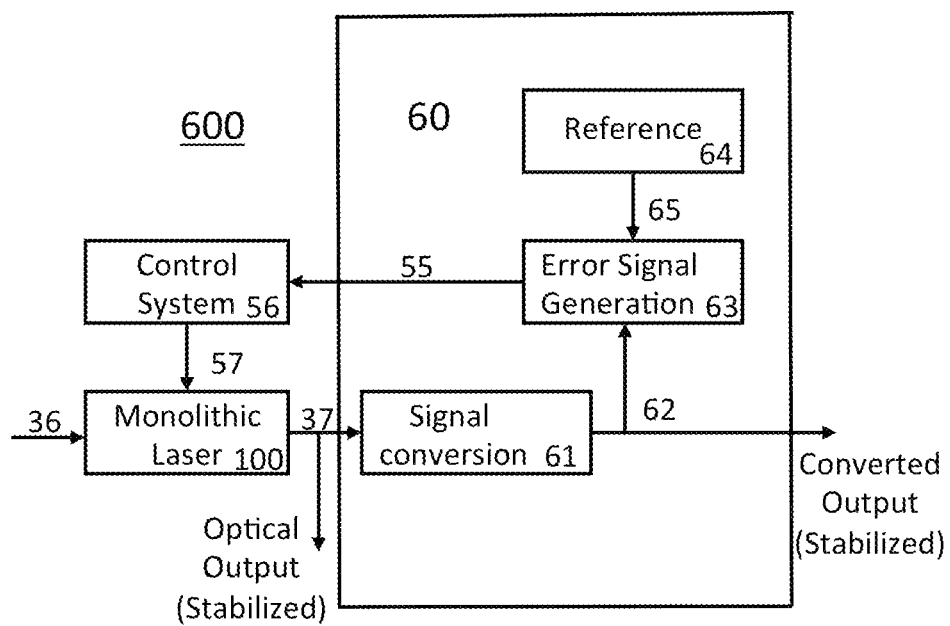
FIG. 6 is a schematic block diagram showing a system for stabilizing a laser to an RF reference according to the present invention.

FIG. 6 is a schematic block diagram showing a system 600 for stabilizing laser 100 to an RF reference 64 according to the present invention (reference 64 and reference signal 65 are herein designated as "RF" for convenience, although the frequency band could be some other frequency band). This system is similar to that of FIG. 5, except that a signal convertor 61 is required before feedback error generation system 60 since reference 64 is in a lower frequency band than the laser output signal 37. Signal convertor 61 converts laser output signal 37 to an RF output signal 62. Reference 64 generates a reference signal 65 which is compared by error signal generator 63 to signal 62 to generate an error signal 55. Then control system 46 generates control signal 47 as described above.

Figure 7:
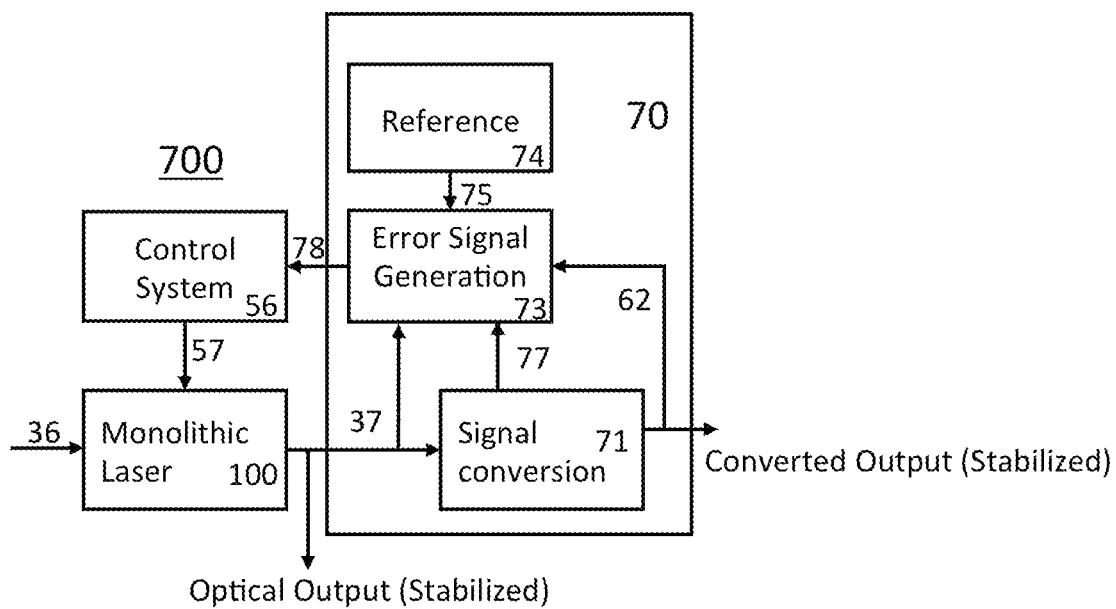
FIG. 7 is a schematic block diagram showing a second system for stabilizing a laser to one or more RF and/or optical references according to the present invention.

FIG. 7 is a schematic block diagram showing a second generalized system 700 for stabilizing laser 100 to one or more RF and/or optical references 74. This system is different from that shown in FIG. 6 in the sense that both degrees of freedom of an optical frequency comb can be stabilized. These two degrees of freedom are the pulse repetition rate and the field repetition rate (also known as the carrier-envelope offset frequency), except that a portion of laser output signal 37 is provided to error signal generator 73. Signal conversion 71 could include a carrier-envelope phase detector and/or a repetition rate detector. Error signal generator 73 compares the reference signal 75 with signals 37 and 77 to generate error signals 78 to control system 56 as described above.

While the exemplary preferred embodiments of the present invention are described herein with particularity, those skilled in the art will appreciate various changes, additions, and applications other than those specifically mentioned, which are within the spirit of this invention.

What is claimed is:

1. A monolithic laser cavity for generating an output series of pulses with an input pump signal comprising:

a spacer comprising $CaF_2$ which is optically transparent at desired frequencies;

a solid laser gain medium affixed to the spacer with no gas or vacuum gap between the spacer and the gain medium;

a solid pulse forming material configured to initiate and maintain modelocking affixed to the spacer with no gas or vacuum gap between the spacer and the pulse forming medium; and optics for confining a laser beam at the desired frequencies within the cavity substantially without waveguiding.

2. The laser cavity of claim 1 formed in a linear cavity configuration wherein the optics comprise a partially transparent input mirror for introducing the input pump signal affixed to the spacer with no gas or vacuum gap between the spacer and the input mirror and a partially transparent output mirror for transmitting the output series of pulses affixed to the spacer with no gas or vacuum gap between the spacer and the input mirror.

3. The laser cavity of claim 1 formed in a ring cavity configuration wherein the optics are affixed to the spacer with no gas or vacuum gap between the spacer and the optics.

4. The laser cavity of claim 3 wherein the pulse forming material is affixed to the gain medium and the gain medium is disposed between the pulse forming material and the spacer.

5. The laser cavity of claim 4 wherein the pulse forming material comprises a semiconductor saturable absorber.

6. The laser cavity of claim 4 wherein the pulse forming material comprises an organic material.

7. The laser cavity of claim 4 wherein the pulse forming material results in Kerr-lens mode-locking.

8. The laser cavity of claim 3 wherein the optics further comprise one or more of the following:
a dispersion compensating element;
a loss modulator;
a phase modulator;
a cavity length modulator.

9. The laser cavity of claim 3 further comprising a stabilization system comprising:
a feedback error generation system for comparing a comparison signal based on the output series of pulses to a reference and generating an error signal; and
a control system for affecting laser performance based on the error signal.

10. The laser cavity of claim 9 wherein the reference and the comparison signal are in a different frequency band than the laser beam and further comprising a signal converter for converting the output series of pulses into the comparison signal.

11. The laser cavity of claim 9 wherein the control system affects a repetition rate of the output series of pulses.

12. The laser cavity of claim 9 wherein the control system affects a phase of an optical carrier of the laser beam.

13. The laser cavity of claim 3 wherein the spacer sinks heat from the gain medium.

14. The laser cavity of claim 3 wherein the gain medium comprises Yb:Er:glass.

15. The laser of claim 3 wherein the gain medium also acts as the pulse forming material.

16. The method of generating an output series of pulses with an input pump signal comprising the steps of:
(a) forming an integral laser cavity including—
a spacer comprising $CaF_2$ which is optically transparent at desired frequencies, a solid laser gain medium affixed to the spacer with no gas or vacuum gap between the spacer and the gain medium, a solid pulse forming material configured to initiate and maintain modelocking affixed to the spacer with no gas or vacuum gap between the spacer and the pulse forming medium, and optics for confining a laser beam at the desired frequencies within the cavity substantially without waveguiding; and (b) powering the laser cavity with a pump beam.

17. The method of claim 16 further including the step of arranging the gain medium between the pulse forming material and the spacer.

18. The method of claim 16 further comprising the step of stabilizing the laser by:

comparing a signal based on the output series of pulses with a reference and generating an error signal; and modifying laser performance based on the error signal.

19. The method of claim 18 wherein the modifying steps affects at least one of the following:

the repetition rate of the output series of pulses; or the phase of an optical carrier of the laser beam.

20. The method of claim 16 further including the step of sinking heat from the gain medium with the spacer.

* * * * *